United States Patent
Ronen

(10) Patent No.: US 6,285,660 B1
(45) Date of Patent: Sep. 4, 2001

(54) USER NETWORK CONTROL

(75) Inventor: Yzhak Ronen, West Windsor, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/353,762

(22) Filed: Jul. 15, 1999

(51) Int. Cl.$^7$ .................................................. H04L 12/16
(52) U.S. Cl. ............................................................ 370/259
(58) Field of Search .................................... 370/259, 412, 370/429, 260, 264, 248, 389, 236, 252, 244; 375/221, 232; 379/265, 88.01; 709/221

(56) References Cited

U.S. PATENT DOCUMENTS 5,175,800 * 12/1992 Gails et al. ............................. 706/45
5,572,674 * 11/1996 Ernst ..................................... 709/221

* cited by examiner

Primary Examiner—Wellington Chin
Assistant Examiner—Prenell Jones

(57) ABSTRACT

A network control device and methods that incorporate user decisions into network management and controlling the network accordingly. The users are provided network information such as bandwidth and special services that are available due to current network conditions. The users may elect to communicate via one of the offered special services or choose to communicate using specific network parameters in the form of a request. The network control device either responds to the request by providing the selected service or if network parameters are specified, by assessing current network conditions and determining whether the network can support the requested communication. If the communication is supportable, then the network control device may indicate to the user that fact and may also provide a corresponding cost estimate and/or other pertinent information. If the network cannot support the requested communication due to lack of bandwidth, for example, then the network control device may generate and send alternatives to the user. If the user selects one of the alternatives, or accepts the cost estimate for the original request, the network control device may issue appropriate commands to various network elements to commence the requested communication.

30 Claims, 7 Drawing Sheets

USER NETWORK CONTROL

BACKGROUND OF THE INVENTION

1. Field of Invention

The invention is related to methods and apparatus for user network control.

2. Description of Related Art

Network management, such as for communication networks, are transparent to users. When a call is made, in a telephone network for example, the network automatically routes the call based on network administration policies determined by administrators to achieve a desired performance (e.g., reduce network congestion by distributing network traffic). As networks become more complex and with increasing number of traffic types (voice, video, text, data, etc.), managing network performance also becomes more difficult. Thus, new technology is needed to resolve the above difficulties.

SUMMARY OF THE INVENTION

The invention provides a network control device and methods that incorporate user decisions into network management and controlling the network accordingly. The users are provided network information such as available bandwidth and special services that are available due to current network conditions, for example. The users may elect to communicate via one of the offered special services or choose to communicate using specific network parameters, i.e., bandwidth, end-to-end delay, transmission error rate, encryption, type of communication (e.g. voice, video, data), etc., in the form of a request. The network control device either responds to the request by providing the selected service or if network parameters are specified, by assessing current network conditions and determining whether the network can support the requested communication.

If the requested communication (either the offered special services or specified network parameters) is supportable, then the network control device may indicate to the user that fact and may also provide a corresponding cost estimate and/or other pertinent information. If the network cannot support the requested communication due to lack of bandwidth, for example, then the network control device may generate and send alternatives to the user. If the user selects one of the alternatives, or accepts the cost estimate for the original request, the network control device may issue appropriate commands to various network elements to commence the requested communication.

BRIEF DESCRIPTION OF THE DRAWINGS

The invention is described with reference to the following figures, wherein like numerals represent like elements, and wherein.

DETAILED DESCRIPTION

The invention provides methods and apparatus for sharing control of a communication network with end-users (users). For example, users may be provided with current network information such as available bandwidth, areas of congestion, end-to-end delay to specified destinations, error rate experienced, etc. and/or special services (and special prices including free services) currently available. If communication is desired, the user may, in a request, either select one of the offered special services or specify a communication with desired network control parameters. When the request is received, the network control device either provides a selected special service or determines, based on current network conditions, whether the requested network parameters are supportable by the network. If supportable, the network control device may provide a cost estimate and/or other pertinent information to the user. If not supportable, then the network control device may provide alternative network parameters to the user. Depending on the user's response, the network control device issues commands to appropriate network elements to commence the user's communication. If the user elects to forego the desired communication, the network control device terminates further processing, for example. In this way, the user participates in managing the network so that communication quality for each user may be controlled, in part, by the user.

Figure 1:
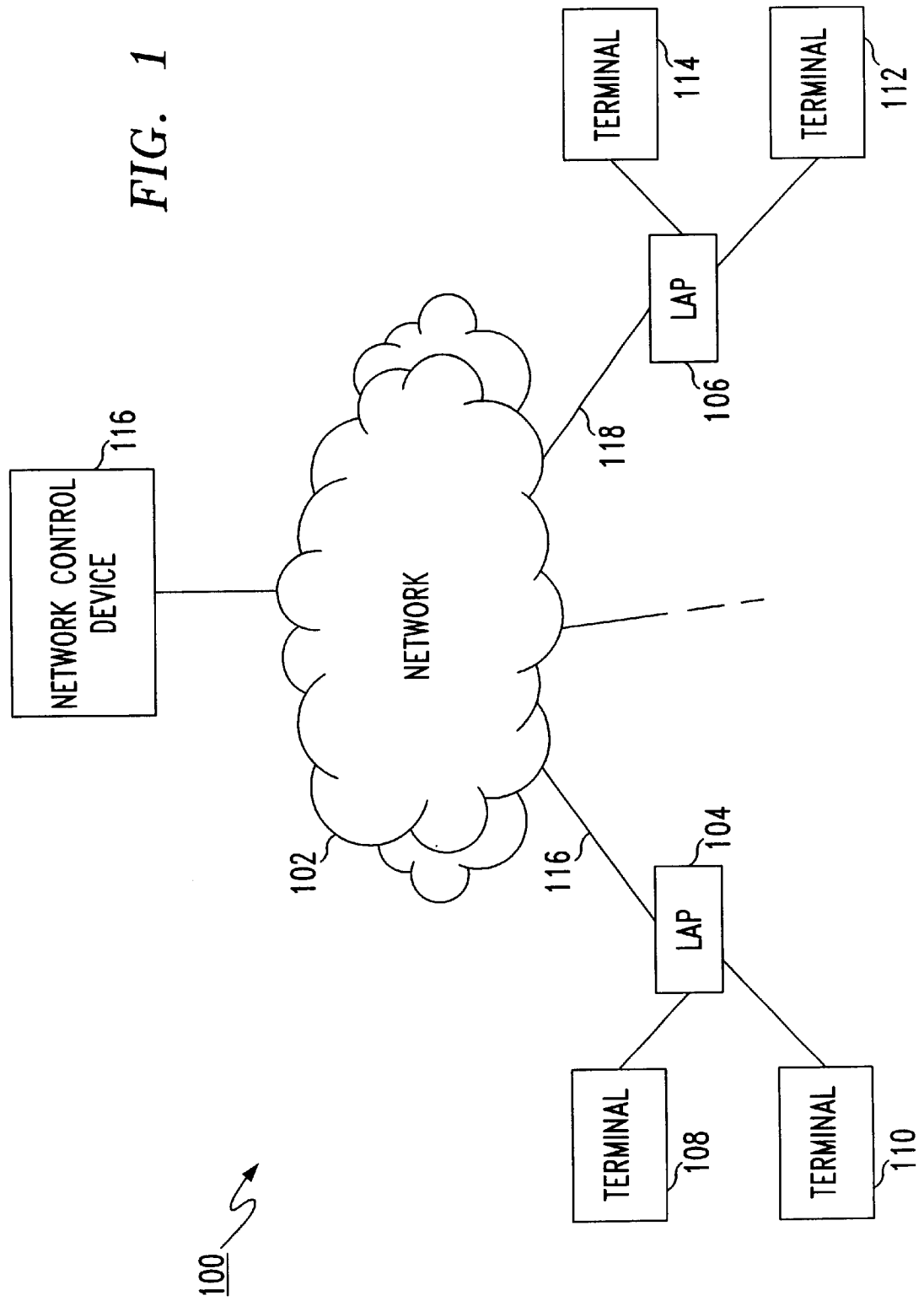
FIG. 1 is an exemplary block diagram of a communication system.

FIG. 1 shows a communication system 100 that includes a network 102, local access providers (LAP) 104 and 106 coupled to the network via links 116 and 118, terminals 108–114 and a network control device 116. The LAPs 104 and 106 may be local exchange carriers, Internet Service Providers or other units that provide terminals 108–114 access to the network 102 for communications. The terminals 108–114 may be devices such as analog telephone stations cellphones, personal digital assistants, or devices such as personal computers or workstations, or more complex units such as private branch exchanges, servers or mainframe computers. The network 102 may be a single network or a complex group of connected networks.

Figure 2:
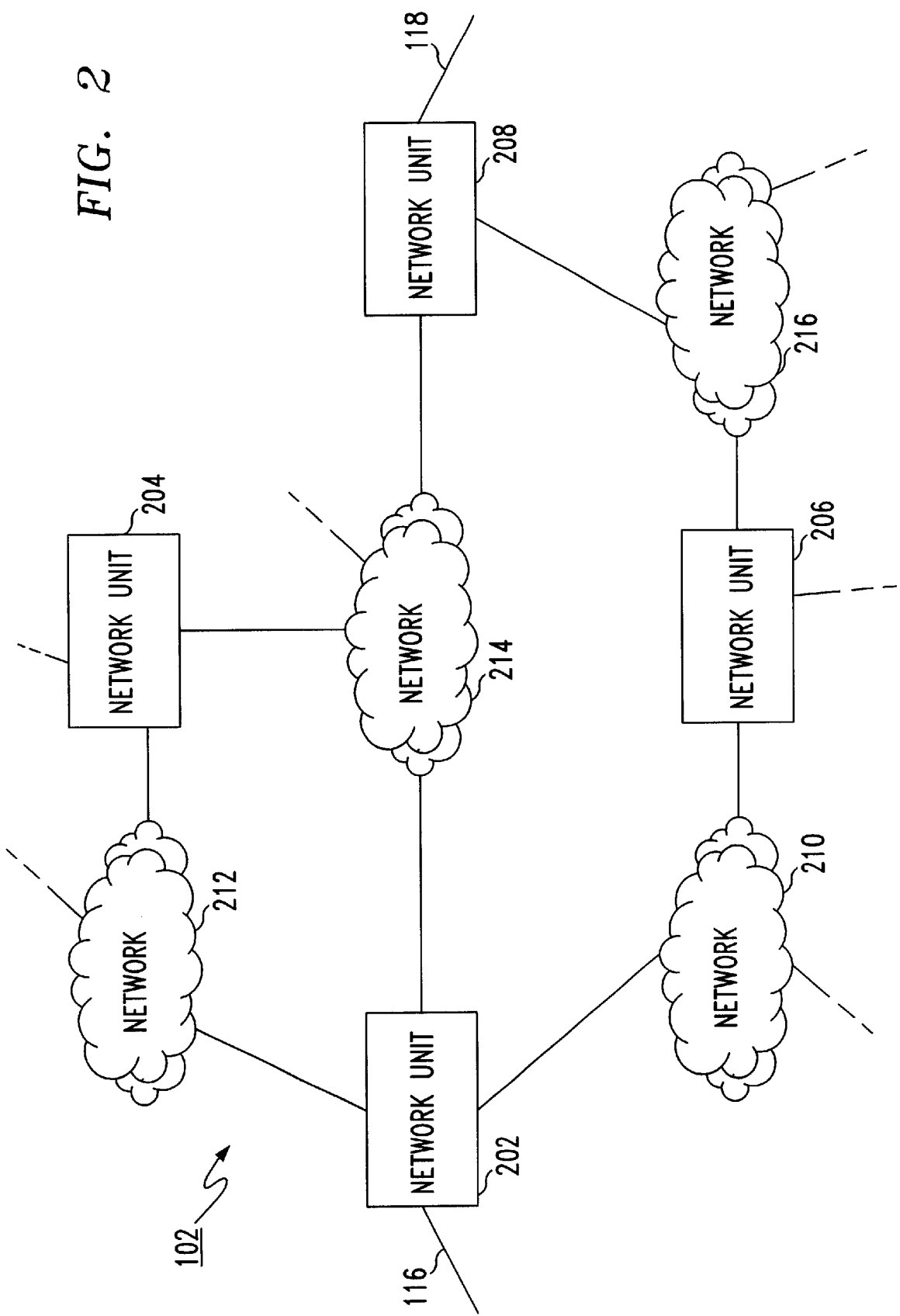
FIG. 2 is an example of a more detailed diagram of a network shown in FIG. 1.

FIG. 2 shows a possible detailed diagram of the network 102 which may include network units 202–208 and networks 210–216, for example. The LAP 104 is coupled to the network unit 202 via the link 116 and the LAP 106 is coupled to the network unit 208 via the link 118. The network units 202–208 may be servers or routers of the network 102 and the networks 210–216 may be various different types of networks that are integrated together with the network units 202–208 to form the network 102. For example, the network 102 may include a mix of network types that support data transmission via data packets, frames, or switches; analog or digital, wired or wireless transmissions; or the networks may be LANs or WANs such as token ring, ethernet, X.25, H.323, ATM, etc.

At any one moment in time, the network units 202–208 and networks 210–216 may be at different congestion levels, for example. Thus, the amount of resources available to support a new communication may be different depending on which of the network units 202–208 and networks 210–216 are used to route the communication signals. The network units 202–208 and networks 210–216 may be regulated by network administration policies. The network administration policies may be insensitive to any particular communication because the policies may be decided based on historical or statistical communication traffic patterns which may not account for any specific communication signals of a particular user. Thus, if only network management policies are enforced when the user desires to conduct communication over the network 102, the user's communication signals may be directed to undesirable networks that results in large message delay, for example.

Table 1 below shows an example of a generalized network management policy where network resources in terms of percentage of network bandwidth may be devoted to different types of communications according to a time schedule. Table 1 shows that audio communication (e.g., telephone calls) is provided greater than 50% of the network bandwidth between 8:00 a.m. and 12:00 a.m. during the weekdays (Monday–Friday). During weekends (Saturday and Sunday), the percentage bandwidth is reassigned so that the bandwidth for audio communication between 12:00 a.m. and 8:00 a.m. is increased from 5% to 10% to account for users having more time during the weekends to conduct telephone calls, for example.

TABLE 1

| Communication Type | % Network Bandwidth | Schedule | Days of Week |
|---|---|---|---|
| Audio | 5 | 12:00 AM–8:00 AM | Monday–Friday |
|  | 50 | 8:00 AM–4:00 PM |  |
|  | 60 | 4:00 PM–8:00 PM |  |
|  | 50 | 8:00 PM–12:00 AM |  |
|  | 10 | 12:00 AM–8:00 AM | Saturday–Sunday |
|  | 30 | 8:00 AM–4:00 PM |  |
|  | 75 | 4:00 PM–8:00 PM |  |
|  | 75 | 8:00 PM–12:00 AM |  |
| Video | 1 | 12:00 AM–8:00 AM | Monday–Friday |
|  | 30 | 8:00 AM–4:00 PM |  |
|  | 20 | 4:00 PM–8:00 PM |  |
|  | 10 | 8:00 PM–12:00 AM |  |
|  | 1 | 12:00 AM–8:00 AM | Saturday–Sunday |
|  | 5 | 8:00 AM–4:00 PM |  |
|  | 5 | 4:00 PM–8:00 PM |  |
|  | 5 | 8:00 PM–12:00 AM |  |
| Data | 54 | 12:00 AM–8:00 AM | Monday–Friday |
|  | 10 | 8:00 AM–4:00 PM |  |
|  | 5 | 4:00 PM–8:00 PM |  |
|  | 20 | 8:00 PM–12:00 AM |  |
|  | 29 | 12:00 AM–8:00 AM | Saturday–Sunday |
|  | 1 | 8:00 AM–4:00 PM |  |
|  | 1 | 4:00 PM–8:00 PM |  |
|  | 1 | 8:00 PM–12:00 AM |  |
| Web | 40 | 12:00 AM–8:00 AM | Monday–Friday |
|  | 10 | 8:00 AM–4:00 PM |  |
|  | 15 | 4:00 PM–8:00 PM |  |
|  | 20 | 8:00 PM–12:00 AM |  |
|  | 60 | 12:00 AM–8:00 AM | Saturday–Sunday |
|  | 64 | 8:00 AM–4:00 PM |  |
|  | 19 | 4:00 PM–8:00 PM |  |
|  | 19 | 8:00 PM–12:00 AM |  |

While bandwidth is shown in Table 1 as an example, other network related parameters may also be specified such as error rate, end-to-end delay, etc. Bandwidth is used as an example only for ease of discussion.

For video communication, a large amount of bandwidth is allocated during weekday business hours but very little bandwidth during non-business and weekend hours. Data communication such as file transfers are allocated a large amount of bandwidth during off-peak hours such as from 12:00 a.m. to 8:00 a.m. during weekdays and weekends. The bandwidth allocated to Web communications such as Internet access are at 40% during off-peak hours and 20% during evening hours for weekdays and increased across the board during weekends. Table 1 may be a network allocation for the network 210 while the networks 212, 214 and 216 may each have different allocations based on network conditions local to each of the networks.

If a user has a high priority video communication that must be routed through the network 210 at 3:00 a.m. on Saturday morning, then, according to Table 1, only 1% of bandwidth may be devoted to such communication. Thus, such a video conference may receive very poor quality and perhaps be unacceptable altogether even if, at 3:00 a.m., the network 210 may be able to devote 20% of its bandwidth to the video conference due to less than normal communication traffic at that moment. Thus, while an allocation represented by Table 1 manages the network 102 for optimum general network performance, the network 210 may not provide desirable service for the particular video conference at 3:00 a.m. on Saturday morning.

The above problem may be resolved by including the user in the management of the network. For example, current network information relating to current network conditions may be provided and the user may request communication based on the provided information. Instead of being dictated strictly be network management policies, the network control device 116 may allocate required network resources to the user in view of the general network management policies and the current network conditions, for example. Thus, if the user requests a video conference having a specific bandwidth or delay requirements specified in the request, for example, the network control device 116 may allocate the requested bandwidth if such bandwidth is available based on network conditions collected on an ongoing basis. For example, Table 2 below shows percentage idle for the network unit 202 and for the network 210. The network unit 202 is idle 60% of the time between 12:00 a.m. to 8:00 a.m. during the weekdays and 40% idle during the same period for the weekends. The third column of Table 2 shows a current percentage idle which is the percentage idle information for the network unit 202 at the time of inquiry. Thus, the percentage idle information at 3:00 a.m. on Saturday is 30%. Thus, if the terminal 108 requested a video conference at 3:00 a.m. on Saturday, the network control device 116 may accept the requested video conference if the required bandwidth is less than 30% of the bandwidth provided by the network unit 202 assuming that all other connecting networks 212–216 and network units 204–208 also have sufficient bandwidth to support the video conference.

TABLE 2

| Network or Network Unit | % Idle Average | Current % Idle | Schedule | Days of Week |
|---|---|---|---|---|
| Network unit 202 | 60 | 58 | 12:00 AM–8:00 AM | Monday – Friday |
|  | 10 | 8 | 8:00 AM–4:00 PM |  |
|  | 5 | 10 | 4:00 PM–8:00 PM |  |
|  | 15 | 15 | 8:00 PM–12:00 AM |  |
|  | 40 | 30 (At 3:00 AM) | 12:00 AM–8:00 AM | Saturday |
|  | 15 |  | 8:00 AM–4:00 PM |  |
|  | 5 |  | 4:00 PM–8:00 PM |  |
|  | 0 |  | 8:00 PM–12:00 AM |  |
|  | 40 |  | 12:00 AM–8:00 AM | Sunday |
|  | 15 |  | 8:00 AM–4:00 PM |  |
|  | 5 |  | 4:00 PM–8:00 PM |  |
|  | 0 |  | 8:00 PM–12:00 AM |  |
| Network 210 | 20 | 19 | 12:00 AM–8:00 AM | Monday– Friday |
|  | 10 | 11 | 8:00 AM–4:00 PM |  |
|  | 50 | 45 | 4:00 PM –8:00 PM |  |
|  | 20 | 18 | 8:00 PM–12:00 AM |  |
|  | 60 | 50 (At 3:00 AM) | 12:00 AM–8:00 AM | Saturday |
|  | 40 |  | 8:00 AM–4:00 PM |  |

TABLE 2-continued

| Network or Network Unit | % Idle Average | Current % Idle | Schedule | Days of Week |
|---|---|---|---|---|
| | 80 | | 4:00 PM–8:00 PM | |
| | 30 | | 8:00 PM–12:00 AM | |
| | 60 | | 12:00 AM–8:00 AM | Sunday |
| | 40 | | 8:00 AM–4:00 PM | |
| | 80 | | 4:00 PM–8:00 PM | |
| | 30 | | 8:00 PM–12:00 AM | |

Data may also be provided in Table 2 for network 210 so that if information corresponding to Table 2 were provided for all the network units 202–208 and networks 210–216 of the network 102, the network control device 116 may determine whether a specific request for a communication may be supported. If unsupportable, the network control device 116 may determine the best alternatives based on data such as supplied in Table 2 by mapping routing strategies to achieve required bandwidths.

The user via terminal 108 may send a request based on a display such as shown in Exemplary Display 1 below. In row 1, a destination address (e.g., telephone number) and type of media (e.g., text) is specified. In the third to fifth rows, the user may select a bandwidth and an error rate, for example. Bandwidth and error rate classes of high, medium and low may be provided as shown so that the user may only need to select one of the three possible choices without being very knowledgeable regarding network technology. Also, rows 7, 8, . . . may indicate special network services that may be offered to the user. These special services may be provided by the network control device 116 so that users may take advantage of current network conditions.

EXEMPLARY DISPLAY 1
DESTINATION: 237-494-1013 MEDIA: Text

| Bandwidth | | Error Rate | | Cost |
|---|---|---|---|---|
| High | x | High | | $0.80/min. |
| Medium | | Medium | x | |
| Low | | Low | | |
| Special Services | Bandwidth | Time Available | | Cost |
| Bulk data transfer | 1 mbit/sec | 11:30 PM–3:00 AM | | $0.10/min |
| Video Conference | Multicast | 2:00 AM–4:00 AM | | Free |
| . | . | . | | . |

As shown, the user may have selected high bandwidth having medium error rate and the network control device 116 may determine the supportability of such a selection based on current network conditions. If the selected parameters are supportable, the network control device 116 may add to the display by providing additional information such as a cost of the requested communication as shown in the cost column. For example, the network control device 116 may indicate that for a high bandwidth with medium error rate, a cost of 80¢ per minute will be incurred. If the cost is too high, the user may request the network control device 116 to provide further alternatives at lower costs, for example.

The user may send a request to the network control device 226 to schedule network resources for a future anticipated communication. In this case, the network control device 116 may maintain a network resource reservation database much like conference room reservations so that users may obtain guaranteed network resources for anticipated communication needs.

While in the above discussion, the network control device 116 processes the network traffic data such as provided in Table 2 and generates alternatives for the user without exposing the user to the potentially complex network performance data, other more specific requests are possible. The user may be sophisticated regarding network operations or the terminals 108–114 may host sophisticated programs or devices that may be capable of processing network performance data. In this circumstance, the user or the terminal 108–114 may independently make informed selections of network parameters required to support the desired communication. In such a situation, the terminals 108–114 may be supplied network performance data such as the network traffic data shown in Table 2, for example.

Figure 3:
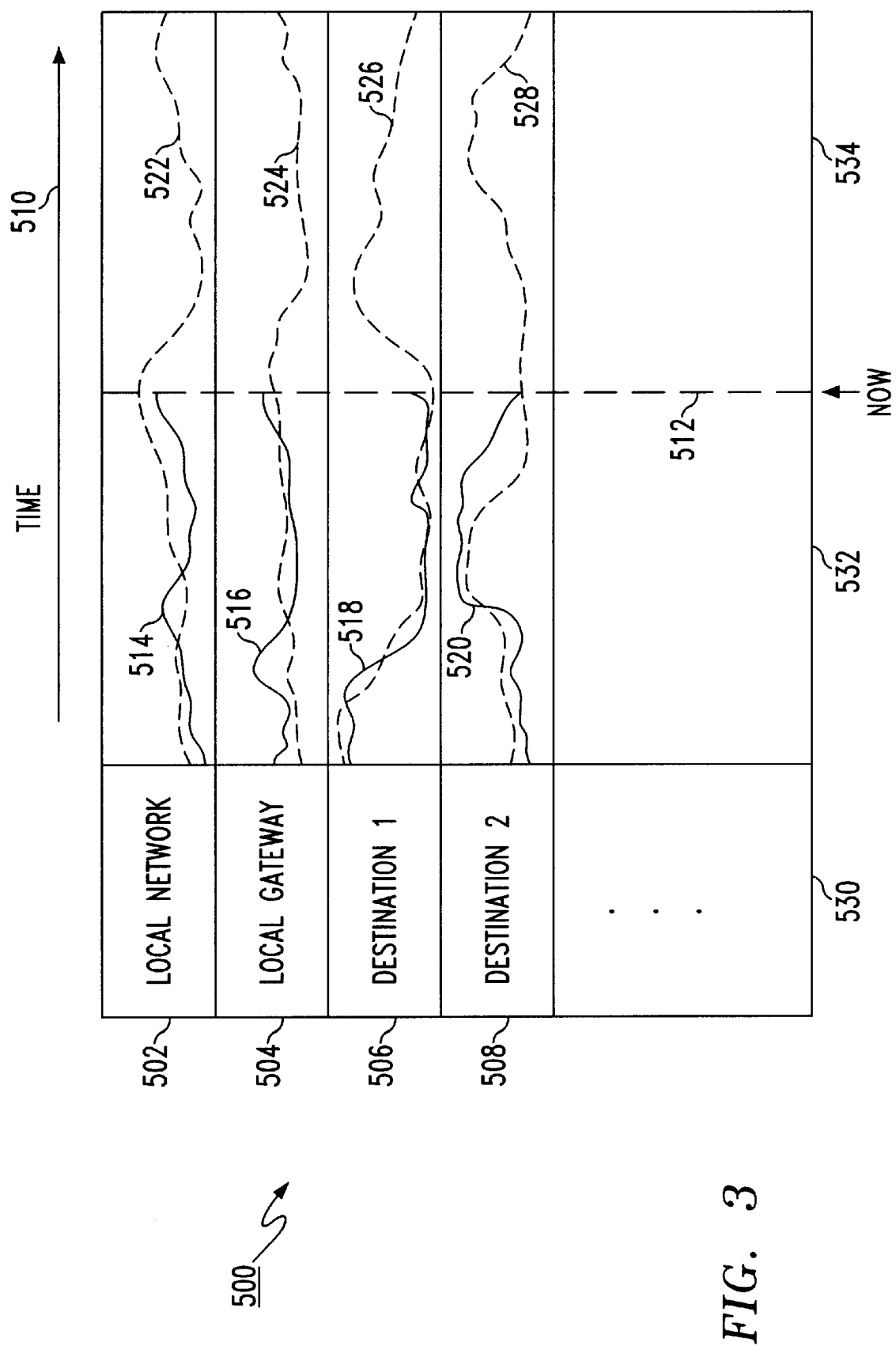
FIG. 3 is an exemplary diagram of a network performance display.

The network performance data may be provided to the user graphically, for example. FIG. 3 shows an exemplary display 500 of network information for the user's perusal. The display 500 includes rows 502–508 which correspond to either specific network components such as a local network or local gateway or destination points such as destination 1 and destination 2. The local network may be the network that includes the terminal 108 and the local gateway may be a server through which the terminal 108 accesses the desired network.

For example, the local gateway may be the network unit 202. Destination 1 may be a telephone number often called by the user and destination 2 may be a particular city such as New York, where the user does business via telecommunications, for example. The display areas 532 and 534 may be load graphs of the elements listed in area 530 corresponding to the rows 502–508. The load graphs may be spanned in time as indicated by the time line 510. The dashed line 512 indicates the current time so that the load graph to the left of the line 512 (area 532) indicates network performance in the past and the data to the right of the line 512 (area 534) indicates network performance in the future. The dashed graphs 522–528 indicate average historical load for each particular element while the solid line graphs 514–520 indicate the data up to the current moment in time (now). Thus, based on the display 500, a user may determine the condition of the network and may make an intelligent choice regarding which of the network elements to select for the desired communication.

For example, the user may have a display such as shown in Exemplary Display 2 below where the left column indicates network elements such as network 210–216 and network units 202–208 and the center column may indicate required bandwidth desired by the user. The user may select any of the networks in the left column based on the graph 500. The Exemplary Display 2 shows that the user selected network 210, 214 and 216 and network units 202, 206 and 208 to communicate between terminals 108 and 114. After making the selection, the network control device 116 may return a cost in the right-most column corresponding to each of the selected network elements. In this way, the user may have comprehensive control of the desired communication.

EXEMPLARY DISPLAY 2
DESTINATION: 237-494-1013 MEDIA: Text
(Terminal 114)

| Network | Bandwidth | Cost |
|---|---|---|
| Network 210 | 64 kilo bits per second | |
| Network 212 | | |

EXEMPLARY DISPLAY 2
DESTINATION: 237–494–1013 MEDIA: Text
(Terminal 114)

| Network | Bandwidth | Cost |
| --- | --- | --- |
| Network 214 | 128 kilo bits per second | |
| Network 216 | 64 kilo bits per second | |
| Network Unit 202 | 192 kilo bits per second | |
| Network Unit 204 | | |
| Network Unit 206 | 64 kilo bits per second | |
| Network Unit 208 | 192 kilo bits per second | |
| . | . | . |
| . | . | . |
| . | . | . |

The network control device 116 may assist the user by providing an initial list of network elements that may be selected for display in corresponding to Exemplary Display 2. For example, the user may indicate in the request that communication to Destination 1 is desired.

In response, the network control device 116 may return a list of network elements as shown in Table 3 below together with data for load graphs as shown in FIG. 3. The user may add to the entries in Table 3 and request more data to be displayed if needed for a selection decision by the user.

TABLE 3

Status Locations

Local Network
Local Gateway
Destination 1
Destination 2
.
.
.

Also, the network control device 116 may provide routing paths information so that user may be informed regarding the relevant connections among the network elements displayed in the graphical display such as shown in FIG. 3. In this way, the relevant routing information known to the network control device 116 may be provided for the user's selection.

The above discussion uses specific examples for illustration purposes only. Other network operating parameters may also be supplied to the user for display such as bit rate, burst bit rate, error rate, encryption techniques for security, etc. The above network parameters may be made available to the user so that the user may make intelligent decisions for control of desired communications. In addition, the network parameters may be grouped together into service classes so that users less knowledgeable may simply select a desired class of service. For example, the user may choose high, medium or low class communications each of which may imply predefined network parameter values requirements.

The user may store desired options via a user profile, for example. Such a profile may contain information such as shown in Table 3 and personalization information such as the information shown in Exemplary Display 1 and Exemplary Display 2. In this way, the user may be provided great convenience for normal communication needs without having to make explicit selections each time a communication is desired.

Returning to FIG. 1, a user at terminal 108 may wish to communicate with a party at terminal 114, for example. The user may first send a request to the network control device 116 by dialing an 800 number, for example. The request may include parameters such as supplied in the Exemplary Display 1 or Exemplary Display 2 as discussed above. When the network control device 116 receives such a request, network performance data either collected in the past or immediately available to the network control device 116 are processed to determine whether the requested network performance parameters are supportable. If supportable, the network control device 116 returns to the terminal 108 a message indicating that the request may be satisfied and also provides the cost for the requested communication. If the requested network performance parameters are not supportable (i.e., either network resources are not available or allocated for other purposes), the network control device 116 may determine alternatives and return such alternatives to the terminal 108 for the user to make further selections.

Assuming that the user makes a selection, the network control device 116 issues commands to all the related network elements in the network 102 which may include LAPs 104 and 106 to support the desired communication between terminal 108 and 114. The network control device 116 may use routing schemes such as splitting the communication signals among several paths, for example, to archive requested bandwidths.

Returning to FIG. 2, the communication signals from link 116 may reach link 118 through two independent paths. For example, the signals may traverse path one which includes network unit 202, network 214, network unit 208, or path two network unit 202, network 210, network unit 206, network 216 and network unit 208. Using such techniques, the network control unit 116 may achieve a composite bandwidth that may satisfy the requested bandwidth indicated in the user's request.

For example, if the communication is supported by data packet transmissions, each of the data packets may be transmitted via independent paths in the network 102. Thus, depending on various available bandwidths and congestion conditions, various networks may be allocated a percentage of the data packets for the communication so that the network may be optimally used to achieve the desired bandwidths.

Other network parameters may also be similarly supported such as end-to-end delay, error rate (data packet drops) and burst bandwidths, for example. All of the above selections may be made by the network control device 116 either by predetermined selection criteria via tables or via intelligent processes such as artificial intelligence, for example. After the network control device 116 determines the optimal routing paths and other required network parameters, commands are issued by the network control device 116 to the various network elements of the network 102 to support the requested communication.

While the above discussion assumes that the network control device 116 is centralized as shown in FIG. 1, the functions of the network control device 116 may be distributed throughout the network 102 or be incorporated as part of every network element within the network 102. In addition, the network control device functions may be incorporated within each of the terminals 108–114 so that each user submits the request to the respective terminals 108–114 which in turn accesses network information via databases available in the network 102 to make the network parameter selections. Once a selection is made, the terminals 108–114 may issue network commands throughout the network 102 to network elements for supporting the desired communication. Thus, various techniques either centralized or distributed may be implemented to incorporate a user's choice of network parameters to support the desired communication.

Figure 4:
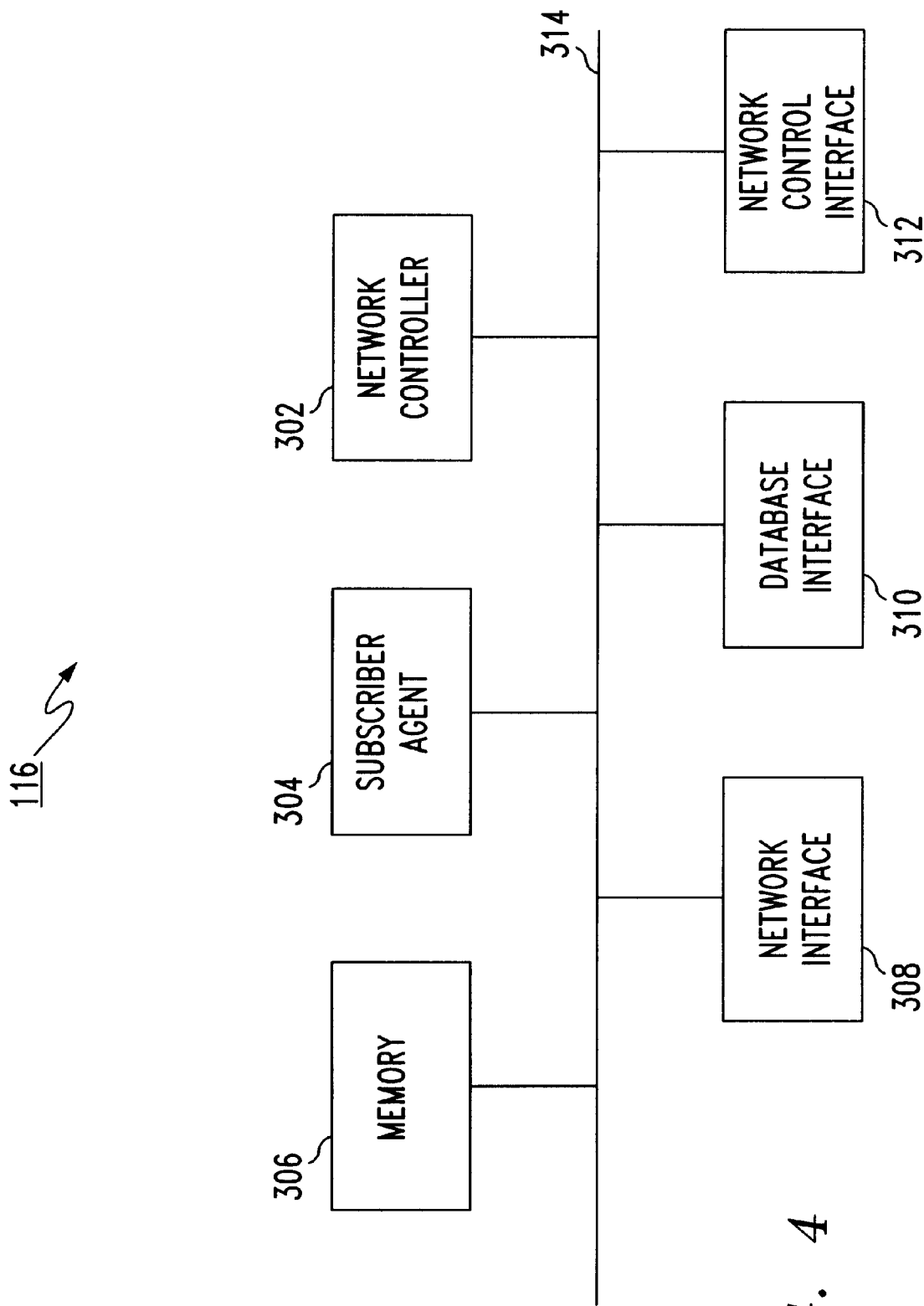
FIG. 4 is an exemplary block diagram of a network control device.

FIG. 4 shows an exemplary block diagram of the network control device 116 which includes a network controller 302, a user agent 304, a memory 306, a network interface 308, a database interface 310 and a network administrator interface 312. The above components are coupled together via bus 314.

During normal operations, the network controller 302 sets the network operation according to network administration policies. While under an applied administration policy, the network controller 302 determines special services that may be offered to users based on current network conditions. The special services may be pre-selected in anticipation of varying network conditions and network administration policies. For example, one of the special services may be data transfers of very large files at very low rates for a limited duration of time. This special service may be offered to users during a temporary lull in the network traffic, for example. The network controller 302 outputs the network conditions and a list of available special services to the users via the network interface 308.

The network controller 302 monitors the network performance either via the network interface 308 or via the network control interface 312 to constantly access the changes in the network conditions. Depending on whether the current network conditions are consistent with network performance criteria assumptions as specified in network administration policies, the network controller 302 may modify network operations to adapt to new network conditions. Thus, the network controller 302 constantly maintains the network operation to be consistent with predetermined administration policies as well as take advantage of specific network conditions to provide users advantages that would otherwise be unavailable. In addition, the network administration policies may be made flexible so that network operations may be adjusted based on user requests so that network management decisions may incorporate user communication decisions.

Figure 5:
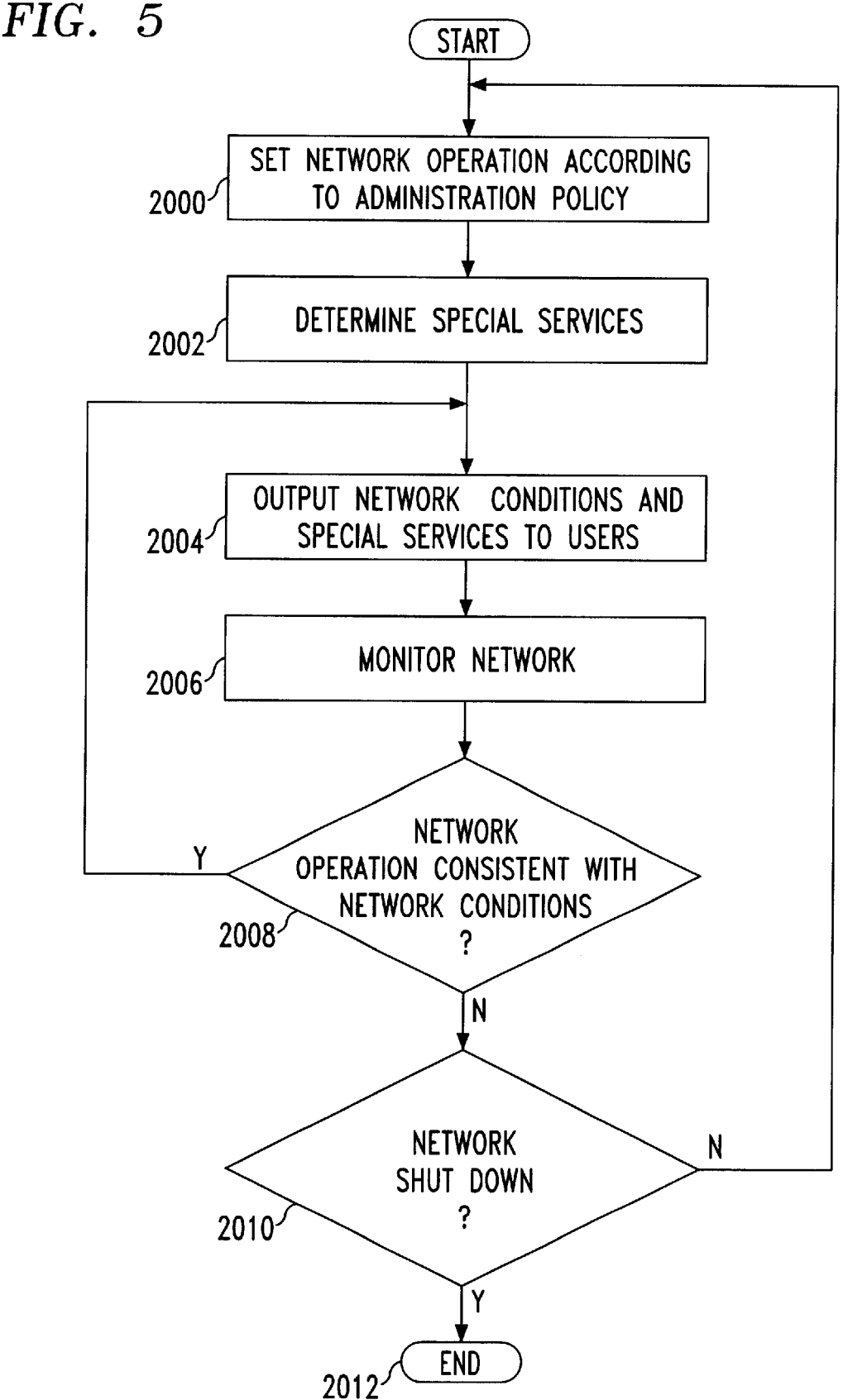
FIG. 5 is an exemplary flowchart of a monitoring process of the network control device.

FIG. 5 shows a flow chart of a network administration process of the network control device 116. In step 2000, the network controller 302 sets the network operation according to administration policies and goes to 2002. In step 2002, the network-controller 302 determines which of the special services may be made available based on current network conditions and goes to step 2004.

In step 2004, the network controller 302 outputs the network conditions and determines special services to users via the network interface 308 and goes to step 2006. In step 2006, the network controller 302 monitors the network 102 via either the network interface 308 or the network control interface and goes to step 2008.

In step 2008, the network controller 302 determines whether the current network conditions is consistent with network performance criteria as dictated by the network administration policies. If consistent, the network controller 302 returns to step 2004; otherwise the network controller 302 goes to step 2010. In step 2010, the network controller 302 determines whether a network shutdown has been activated. If activated, the network controller 302 goes to step 2012 and ends the process; otherwise, the network controller 302 returns to step 2000.

When a request for communication service is received through the network interface 308 to select an offered special service or to request specific network parameters for communication, the user agent 304 determines whether the request may be satisfied. For example, if multiple users elected to take advantage of offered special services and the network 102 cannot support all the requests, then the user agent 304 must reject some of the requests. Also, if a user requests specific network parameters for a particular communication, the user agent 304 must determine whether the network 102 can support such a request.

When requests are received, the user agent 304 retrieves network performance data either from network databases via the data base interface 310 or, from the memory 306 if such data is updated in memory periodically, for example, or directly from the relevant network units 202–208. If the request or selection may be satisfied, the user agent 304 may determine a cost of the requested communication or other pertinent information such as a time period that the requested communication may be supported, for example, and outputs the cost estimate and pertinent information to the user's terminal 108–114 to further inform the user. If the requested communication cannot be satisfied, the user agent 304 may compile other possible options and supply these options to the user for further selections.

If the user accepts either the cost of the requested communication or one of the alternatives, the user agent 304 sends a message to the controller 302 which in turn generates network commands via the network control interface 312 to the various network elements to support the communication.

Figure 6:
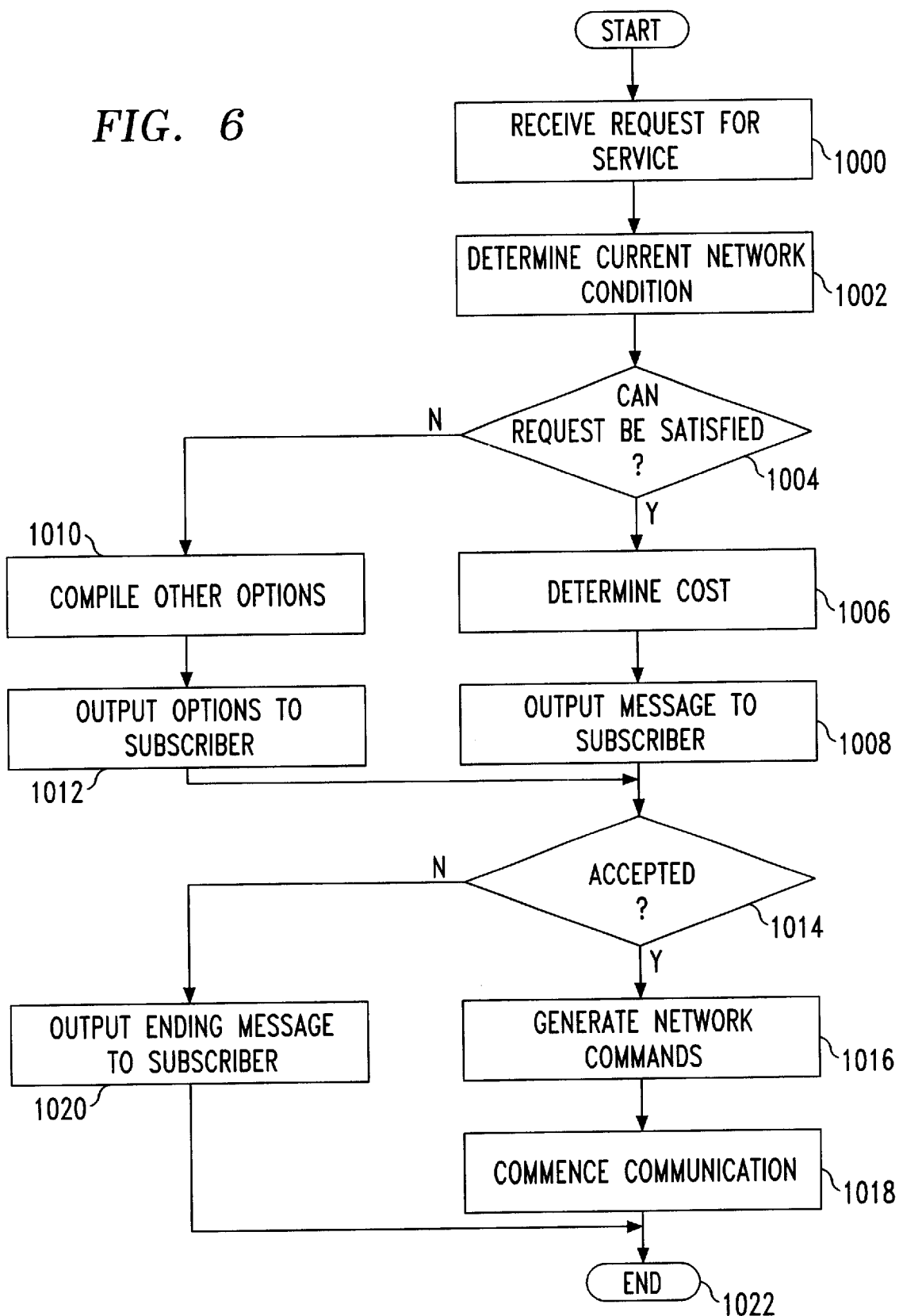
FIG. 6 is an exemplary flowchart of a control process of the network control device.

FIG. 6 shows a flowchart of a process of the network control device 116. In step 1000, the user agent 304 receives a request from a user for service and goes to step 1002. In step 1002, the user agent determines the current network condition and goes to step 1004. In step 1004, the user agent 304 determines whether the requested special service selection or network parameters may be satisfied. If it may be satisfied, the user agent 304 goes to step 1006; otherwise, the user agent 304 goes to step 1010. In step 1006, the user agent 304 determines the cost estimate or other pertinent information of the requested communication and goes to step 1008. In step 1008, the user agent 304 outputs a message which may include the cost estimate or other pertinent information to the user and goes to step 1014.

In step 1010, the user agent 304 compiles other possible options and goes to step 1012. In step 1012, the user agent 304 outputs the alternative options to the user and goes to step 1014.

In step 1014, the user agent 304 determines whether the user accepted the cost for the originally requested communication or one of the alternative options. If accepted, the user agent 304 goes to step 1016; otherwise, the user agent 304 goes to step 1020. In step 1016, the user agent 304 issues a message to the network controller 302 which in turn generates commands to the various network elements to support the requested communication and the user agent 304 goes to step 1018. In step 1018, the user agent 304 commences the requested communication by connecting the user to the desired communicating party and goes to step 1022 to end the process. In step 1020, the user agent 304 outputs an ending message to the user and goes to step 1022 to end the process.

Figure 7:
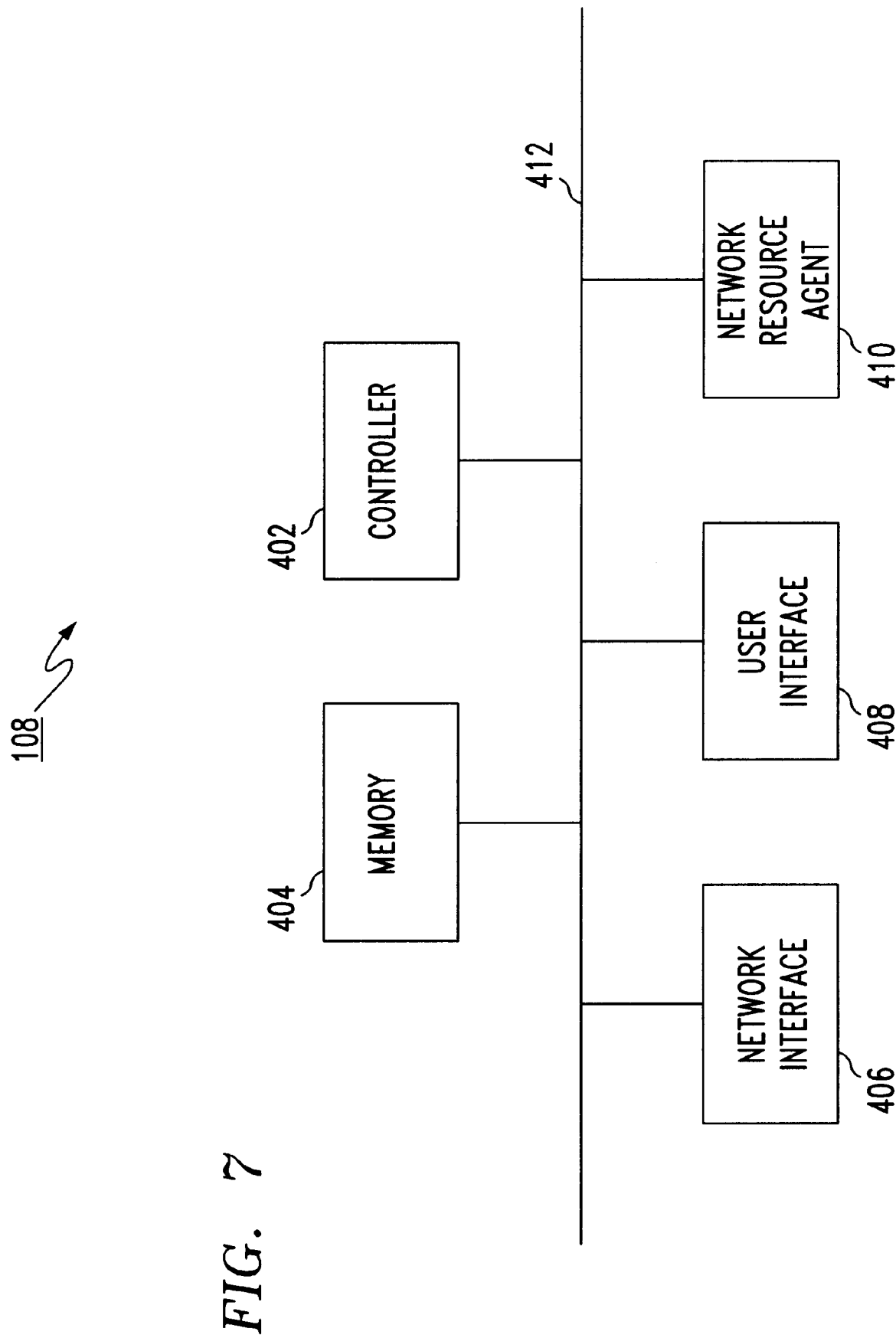
FIG. 7 is an exemplary block diagram of a terminal.

As discussed earlier, the functions of the network control device 116 may be performed by any one of the terminals 108–114. FIG. 7 shows an exemplary block diagram of the terminal 108 (representing any of the terminals 108–114) which includes a controller 402, a memory 404, a network interface 416, a user interface 408 and a network resource agent 410. The above components are coupled together via bus 412.

The network resource agent 410 performs similar functions as the user agent 304 of FIG. 6. The controller 402 performs other terminal functions and supports the network resource agent 410. The memory 404 provides storage for various data to support the functions of the network resource agent 410 such as network parameters as shown in Table 2, for example. Also, the user profiles may be stored in the memory 404 as well as other personalization data. The user interface 408 may include a keyboard and a display device, for example. The network resource agent 410 interacts with the user by displaying network performance information and special services that may be available and to receive either the desired special service or the network parameters displayed on the display device such as the Exemplary Display 1 and Exemplary Display 2. The network interface 406 provides the network resource agent 410 access to the various network elements as well as network databases that may include network performance data, for example.

The network resource agent 410 receives the request from the user via the user interface 408 and determines whether the request may be satisfied based on current network conditions either stored in the memory 404 on a periodic basis or accessed by the network resource agent 410 via the network interface 406. If satisfied, the network resource agent 410 may determine the cost estimate or other pertinent information of the requested communication and request the user to accept the cost via the user interface 408. If the network cannot support the requested communication, the network resource agent 410 may compile other options and present these options to the user via the user interface 408.

If the user accepts one of the provided options or the cost of the originally requested communication, the network resource agent 410 may generate the appropriate network commands and commence the communication. If the user does not accept any of the options or the cost of the original request, the network resource agent 410 may recognize the user's choice and concludes the process.

In view of the above, the network resource agent 410 may perform substantially the same functions as performed by the user agent 304 and the network controller 302 of FIG. 4. Thus, the flowchart shown in FIG. 6 may represent to the process of the network resource agent 410.

The functions of the network control device 116 may also be divided between functions of the terminals 108–114 and various network elements or a central network control device such as the network control device 116. Specific implementations of where to place the functions of the network control device 116 are dependent on specific circumstances that may be encountered.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A method for operating a network to provide communications between terminals, comprising:

receiving a request from an end user that includes network parameters for a variable bandwidth transmission from a terminal interface of an end-user terminal; and controlling the network to support the received request from an end user that includes network parameters for a variable bandwidth transmission in a communication of the end-user terminal.

2. The method of claim 1, further comprising:

retrieving network performance data;

generating an assessment whether the network can support the received request from an end user that includes network parameters based on the network performance data; and outputting results of the assessment to the terminal interface.

3. The method of claim 2, further comprising:

generating a cost of the communication as the results if the assessment indicates that the network can support the network parameters; and generating alternative network parameters that the network can support and corresponding costs as the results if the assessment indicates that the network cannot support the network parameters.

4. The method of claim 3, further comprising receiving an acceptance from the terminal interface of either the cost of the communication using the network parameters or one of the alternative network parameters.

5. The method of claim 2, further comprising:

generating a list of network elements of the network that are relevant to the communication;

selecting performance data of the network elements; and outputting selected performance data to the terminal interface.

6. The method of claim 5, further comprising providing a user profile, the user profile including lists of network parameters related to possible user communications.

7. The method of claim 2, wherein the network performance data includes percentage idle indexed according to time, error rate, and input-output delay.

8. The method of claim 2, wherein the assessment includes evaluating possible routing strategies to achieve requirements of the network parameters.

9. The method of claim 1, wherein the network parameters for a transmission include one or more of bandwidth, error rate, end-to-end delay, video communication, audio communication, encryption, cost and data communication.

10. The method of claim 1, wherein the network includes one or more networks, each of the networks having a type which is one of a data packet network, an analog network, a switching network, a frame protocol network.

11. The method of claim 1, wherein the network parameters includes a network reservation request, the method further comprising:

maintaining record of committed network resources; and updating the record of committed network resources to reflect commitment of network resources to the reservation request if uncommitted network resources is sufficient to support the reservation request.

12. The method of claim 1, further comprising:

monitoring network performance data;

generating a list of special services based on network administration policies and the network performance data; and outputting the network performance data and the list of special services to the terminal interface.

13. The method of claim 1, wherein the controlling of the network includes allocating bandwidth to support the requested network parameters.

14. A network control device interfacing with a network to provide communications between terminals, comprising:

a network controller;

a user agent coupled to the network controller, the user agent receiving a request from an end user that includes network parameters for a variable bandwidth transmission from a terminal interface of an end-user terminal and sending controls to the network to support the received request from an end user that includes network parameters for a variable bandwidth transmission in a communication of the end-user terminal.

15. The device of claim 14, wherein the user agent retrieves network performance data, generates an assessment whether the network can support the received network parameters based on the network performance data, and outputs results of the assessment to the terminal interface.

16. The device of claim 15, wherein the user agent generates a cost of the communication as the results if the assessment indicates that the network can support the network parameters, and generates alternative network parameters that the network can support and corresponding costs as the results if the assessment indicates that the network cannot support the network parameters.

17. The device of claim 16, wherein the user agent receives an acceptance from the terminal interface of either the cost of the communication using the network parameters or one of the alternative network parameters.

18. The device of claim 15, wherein the user agent generates a list of network elements of the network that are relevant to the communication, selects performance data of the network elements, and outputs selected performance data to the terminal interface.

19. The device of claim 16, wherein a user profile is provided that includes lists of network parameters related to possible user communications.

20. The device of claim 15, wherein the network performance data includes percentage idle indexed according tote, error rate, and input-output delay.

21. The device of claim 15, wherein the assessment includes evaluating possible routing strategies to achieve requirements of the network parameters.

22. The device of claim 14, wherein the network parameters for a transmission include one or more of bandwidth, error rate, end-to-end delay, video communication, audio communication, encryption, cost and data communication.

23. The device of claim 14, wherein the network includes one or more networks, each of the networks having a type which is one of a data packet network, an analog network, a switching network, a frame protocol network.

24. The device of claim 14, wherein the network parameters includes a network reservation request, the network controller:

maintaining record of committed network resources; and updating the record of committed network resources to reflect commitment of network resources to the reservation request if uncommitted network resources is sufficient to support the reservation request.

25. The device of claim 14, wherein the network controller monitors network performance data, generates a list of special services based on network administration policies and the network performance data, and outputs the network performance data and the list of special services to the terminal interface.

26. The network control device as claimed in claim 14, wherein the network controller allocates bandwidth to support the received requested network parameters.

27. A method for operating a network to provide communications between terminals, comprising:

receiving network parameters from a terminal interface of an end-user terminal; and controlling the network to support the received network parameters in a communication of the end-user terminal.

28. The method of claim 27, further comprising:

retrieving network performance data;

generating an assessment whether the network can support the received network parameters based on the network performance data; and outputting the results of the assessment to the terminal interface.

29. A network control device interfacing with a network to provide communications between terminals, comprising:

a network controller;

a user agent coupled to the network controller, the user agent receiving network parameters from a terminal interface of an end-user terminal and sending controls to the network to support the received network parameters in a communication of the end-user terminal.

30. The device of claim 29, wherein the user agent retrieves network performance data, generates an assessment whether the network can support the received network parameters based on the network performance data, and outputs results of the assessment to the terminal interface.

* * * * *

UNITED STATES PATENT AND TRADEMARK OFFICE
CERTIFICATE OF CORRECTION

PATENT NO. : 6,285,660 B1
DATED : September 4, 2001
INVENTOR(S) : Yzhak Ronen

It is certified that error appears in the above-identified patent and that said Letters Patent is hereby corrected as shown below:

Column 12, claim 11,
Line 48, the word "includes" should be -- include --.
Line 53, the word "is" should be -- are --

Column 13, claim 20,
Line 35, the word "tote" should be -- to time --.

Signed and Sealed this

Twenty-sixth Day of February, 2002

Attest:

Attesting Officer

JAMES E. ROGAN
Director of the United States Patent and Trademark Office